US009900367B2

(12) United States Patent
Branton

(10) Patent No.: US 9,900,367 B2
(45) Date of Patent: *Feb. 20, 2018

(54) CONTEXT TRANSFER FROM WEB PAGE TO APPLICATION

(71) Applicant: AppSense Limited, Warrington (GB)

(72) Inventor: Paul Keith Branton, Rochdale (GB)

(73) Assignee: AppSense US LLC, South Jordan, UT (US)

(*) Notice: Subject to any disclaimer, the term of this patent is extended or adjusted under 35 U.S.C. 154(b) by 6 days.

This patent is subject to a terminal disclaimer.

(21) Appl. No.: 14/132,307

(22) Filed: Dec. 18, 2013

(65) Prior Publication Data

US 2014/0337743 A1 Nov. 13, 2014

Related U.S. Application Data

(63) Continuation-in-part of application No. 13/892,678, filed on May 13, 2013.

(51) Int. Cl.
*H04L 12/24* (2006.01)
*G06F 17/30* (2006.01)
(Continued)

(52) U.S. Cl.
CPC .......... *H04L 67/02* (2013.01); *H04L 63/20* (2013.01); *G06F 9/44526* (2013.01); *H04L 63/1441* (2013.01)

(58) Field of Classification Search
CPC .................................. G06F 17/30; G06F 7/00
See application file for complete search history.

(56) References Cited

U.S. PATENT DOCUMENTS 7,231,661 B1 * 6/2007 Villavicencio et al. ........... 726/4
7,296,235 B2 * 11/2007 Bhat et al. ..................... 715/744

(Continued)

FOREIGN PATENT DOCUMENTS

WO    WO-02/31685 A1    4/2002
WO    WO-2005/091107 A1    9/2005

(Continued)

OTHER PUBLICATIONS

United Kingdom Search Report issued by The United Kingdom Intellectual Property Office for Application No. GB1408457.8 dated Nov. 25, 2014 (3 pages).
United Kingdom Search Report issued by The United Kingdom Intellectual Property Office for Application No. GB1408468.5 dated Oct. 27, 2014 (4 pages).
United Kingdom Search Report issued by The United Kingdom Intellectual Property Office for Application No. GB1408483.4 dated Dec. 3, 2014 (4 pages).

(Continued)

*Primary Examiner* — Nicholas Taylor
*Assistant Examiner* — Sanjoy Roy

(57) ABSTRACT

Systems and methods are described for a web event framework. A computerized method includes receiving, at a framework plugin coupled to a web browser, a framework action from a framework server, the framework action including arguments specifying context data to retrieve from a web page loaded on the web browser; executing the framework action by the framework plugin, wherein executing the framework action comprises retrieving the specified context data from the web page and generating, by the framework plugin, a framework event including the context data; forwarding the framework event to a framework server coupled to the framework plugin; receiving at the framework server the framework event from the framework plugin; determining, at the framework server, a framework action based on the framework event, including the specified data, and a framework policy; and sending instructions to an external process based on the specified data and the framework action.

19 Claims, 9 Drawing Sheets

(51) Int. Cl.
  *H04L 29/08* (2006.01)
  *G06F 9/445* (2018.01)
  *H04L 29/06* (2006.01)

(56) References Cited

U.S. PATENT DOCUMENTS

| | | | |
|---|---|---|---|
| 7,353,375 B2 | 4/2008 | Cepulis | |
| 7,711,832 B1 | 5/2010 | Champion et al. | |
| 7,865,931 B1 | 1/2011 | Stone et al. | |
| 7,937,755 B1 | 5/2011 | Guruswamy | |
| 9,167,052 B2 | 10/2015 | Branton et al. | |
| 2002/0065955 A1* | 5/2002 | Gvily | 709/330 |
| 2003/0101235 A1* | 5/2003 | Zhang | 709/218 |
| 2004/0003043 A1 | 1/2004 | Rajamony et al. | |
| 2004/0128389 A1 | 7/2004 | Kopchik | |
| 2005/0021978 A1 | 1/2005 | Bhat et al. | |
| 2005/0229104 A1 | 10/2005 | Franco et al. | |
| 2006/0080523 A1 | 4/2006 | Cepulis | |
| 2006/0130139 A1 | 6/2006 | Sobel et al. | |
| 2006/0212514 A1* | 9/2006 | Saillet | G06F 17/30861 709/203 |
| 2007/0198525 A1 | 8/2007 | Chatterjee et al. | |
| 2008/0172382 A1* | 7/2008 | Prettejohn | 707/6 |
| 2008/0229288 A1 | 9/2008 | Nelson et al. | |
| 2008/0307506 A1* | 12/2008 | Saldhana | 726/4 |
| 2009/0241143 A1 | 9/2009 | White et al. | |
| 2010/0077444 A1* | 3/2010 | Forristal | 726/1 |
| 2010/0211796 A1* | 8/2010 | Gailey | G06F 21/31 713/182 |
| 2010/0313252 A1 | 12/2010 | Trouw | |
| 2011/0138059 A1 | 6/2011 | Schleifer | |
| 2011/0247045 A1* | 10/2011 | Rajagopal | H04L 63/08 726/1 |
| 2012/0159145 A1* | 6/2012 | Cheong et al. | 713/100 |
| 2013/0086020 A1 | 4/2013 | Addala | |
| 2013/0145361 A1* | 6/2013 | Kaegi | 717/176 |
| 2013/0167045 A1 | 6/2013 | Xu et al. | |
| 2013/0185362 A1 | 7/2013 | Clagg et al. | |
| 2014/0189804 A1 | 7/2014 | Lehmann et al. | |
| 2014/0207863 A1* | 7/2014 | Steinberg et al. | 709/204 |
| 2014/0337495 A1 | 11/2014 | Branton et al. | |
| 2014/0337511 A1 | 11/2014 | Branton et al. | |

FOREIGN PATENT DOCUMENTS

| | | |
|---|---|---|
| WO | WO-2010/039505 A2 | 4/2010 |
| WO | WO-2013/109450 A1 | 7/2013 |

OTHER PUBLICATIONS

"Browser extension", http://en.wikipedia.org/w/index.php?title=browser_extension&printable=yes, printed on May 8, 2013, 3 pages.

"DesktopNow: Simply the management of any Windows desktop, physical or virtual, while increasing IT control and user productivity.", http://www.appsense.com/products/desktop/desktopnow/, printed on May 13, 2013, 2 pages.

"Encrypting File System", http://en.wikipedia.org/wiki/Encrypting_File_System, printed on Sep. 3, 2013, 8 pages.

"iOS App Programming Guide", http://developer.apple.com/library/ios/#DOCUMENTATION/iPhone/Conceptual/iPhoneOsProgrammingGuide/AdvancedAppTricks/AdvancedAppTricks.html#//apple_ref/doc/uid/TP40007072-CH7-SW11, Apr. 23, 2013, 149 pages.

"Fingerprint (computing)", http://en.wikipedia.org/wiki/Fingerprint_%28computing%29, printed on Sep. 3, 2013, 4 pages.

"Citrix ShareFile", http://www.sharefile.com/, printed on Jul. 24, 2013, 2 pages.

"OpenText Managed File Transfer", http://connectivity.opentext.com/resource-centre/evaluations/opentext-managed-file-transfer.aspx, Copyright 2011, printed on Sep. 3, 2013, 1 page.

"AutoHotkey", (http://www.autohotkey.com), retrieved from the internet on May 5, 2014 (2 pages).

Office Action for U.S. Appl. No. 13/892,678, dated Apr. 3, 2017, 32 pages.

Office Action for U.S. Appl. No. 13/892,678, dated Sep. 9, 2016, 28 pages.

Office Action for U.S. Appl. No. 13/892,678, dated May 21, 2015, 27 pages.

Office Action for U.S. Appl. No. 13/892,678, dated Dec. 31, 2015, 30 pages.

Office Action for U.S. Appl. No. 14/243,040, dated Mar. 21, 2017, 23 pages.

Office Action for U.S. Appl. No. 14/243,040, dated Nov. 21, 2016, 20 pages.

Office Action for U.S. Appl. No. 14/243,040, dated Feb. 11, 2016, 28 pages.

Office Action for U.S. Appl. No. 14/243,040, dated Jun. 5, 2015, 26 pages.

Office Action dated Aug. 14, 2017 for U.S. Appl. No. 13/892,678.

* cited by examiner

CONTEXT TRANSFER FROM WEB PAGE TO APPLICATION

CROSS REFERENCE TO RELATED APPLICATION

This application is a continuation-in-part of U.S. application Ser. No. 13/892,678, filed May 13, 2013, which is incorporated by reference in its entirety as though fully disclosed herein.

TECHNICAL FIELD

This application relates generally to centralized software environment management, and more specifically to a framework for network-based remote management of client systems.

BACKGROUND

Computer systems can provide user environment management and/or policy control for computing devices (e.g., Windows based PCs). A system policy can be defined within an enterprise computer network either: to respond to system events such as computer startup/shutdown, user login/logoff, process start/stop, and session changes, etc.; or to prevent or control user behavior in applications and the desktop environment. For example, a pre-defined script can run when a user logs in to a corporate network; a particular group of users can be prevented from using parts of an application. The conventional user environment and/or policy control mechanisms, however, are limited to handle application and system level events and policies, not events and policies related to web browsers. Some examples of web events include webpage loading, URL clicking, adding/deleting a tab within a web browser, etc. Typical policies include, for example, blocking of URLs and redirection and preventing use of particular buttons or menus inside an web page.

SUMMARY

In accordance with the disclosed subject matter, systems and methods are described for a web event framework.

Disclosed subject matter includes, in one aspect, a computerized method, which includes receiving, at a framework plugin coupled to a web browser, a framework action from a framework server, the framework action including arguments specifying context data to retrieve from a web page loaded on the web browser; executing the framework action by the framework plugin; forwarding the framework event to a framework server coupled to the framework plugin; receiving at the framework server the framework event from the framework plugin; determining, at the framework server, a framework action based on the framework event, including the specified data, and a framework policy; and sending instructions to an external process based on the specified data and the framework action. Executing the framework action includes retrieving the specified context data from the web page and generating, by the framework plugin, a framework event including the context data.

In some embodiments, the framework action is determined at the framework server based on a previous framework event received from the framework plugin.

In some other embodiments, the previous framework event is generated by the framework server in response to the framework server receiving a web event from the web browser.

In some other embodiments the web event is the web browser loading the web page.

In some other embodiments wherein the external process is a desktop application run on the same client computing device as the web browser.

In some other embodiments sending the instructions comprises sending inputs that the external process interprets according to a user interface.

In some other embodiments, the computerized method includes receiving the framework policy from a policy store.

In some other embodiments, the computerized method includes customizing the framework server based on the framework policy.

In some other embodiments, the computerized method includes receiving at the framework server an external event from an external event source and determining, at the framework server, the framework action based on the external event and the framework policy.

In some other embodiments, the computerized method includes forwarding the framework action over a network to a second framework server.

In some other embodiments, the computerized method includes processing the framework action by the second framework server.

In some other embodiments, the computerized method includes forwarding the framework event over a network to a second framework server.

In some other embodiments, the computerized method includes determining at the second framework server a second framework action based on the framework event and a second framework policy.

Disclosed subject matter includes, in another aspect, a computer system for a web event framework, which includes a processor configured as a framework plugin coupled to a web browser. The framework plugin includes a framework server interface configured to receive a framework action from a framework server, the framework action including arguments specifying context data to retrieve from a web page loaded on the web browser, a browser interface configured to communicate with the web browser and retrieve the specified context data from the web page, and a framework event generator configured to generate a framework event including the context data. The framework server interface is further configured to send the framework event to the framework server. The processor is further configured as a framework server communicating with the framework plugin, including framework plugin interface configured to receive the framework event from the framework plugin, a framework action determiner configured to determine a framework action based on the framework event, including the specified data, and a framework policy, and an external process interface configured to send instructions to an external process based on the specified data and the framework action.

In some other embodiments, the framework server also includes a policy store interface configured to receive the framework policy from a policy store.

In some other embodiments, the framework server also includes a framework policy configurator configured to customize the framework server based on the framework policy.

In some other embodiments, the framework server also includes a webpage updater configured to generate or modify a webpage.

In some other embodiments, the framework server also includes an external event interface configured to receive an external event from an external event source and the framework action determiner is further configured to determine the framework action based on the external event and the framework policy.

In some other embodiments, the framework plugin interface is further configured to communicate with a second framework plugin coupled with a second web browser.

Disclosed subject matter includes, in yet another aspect, a non-transitory computer readable medium having executable instructions operable to, when executed by a processor, cause the processor to receive, at a framework plugin coupled to a web browser, a framework action from a framework server, the framework action including arguments specifying context data to retrieve from a web page loaded on the web browser; execute the framework action by the framework plugin; forward the framework event to a framework server coupled to the framework plugin; receive at the framework server the framework event from the framework plugin; determine, at the framework server, a framework action based on the framework event, including the specified data, and a framework policy; and send instructions to an external process based on the specified data and the framework action. Executing the framework action includes retrieving the specified context data from the web page and generating, by the framework plugin, a framework event including the context data.

Various embodiments of the subject matter disclosed herein can provide one or more of the following capabilities. Systems and methods for a web event framework can reduce system complexity. Framework servers and framework plugins can be designed without complex business logic. For example, a framework server can act as a simple event sink while a framework plugin can act as an event producer. A framework server can receive framework events from all event sources and determine framework actions based on a framework policy. Systems and methods for a web event framework can also improve flexibility and maintainability. Changing a framework policy itself can change the behaviors of a web event framework. There is no need to modify the framework server and/or the framework plugin. Systems and methods for a web event framework can also increase extendibility. Adding framework events to a framework policy can expand the list of events handled by a web event framework without updating the framework server and/or the framework plugin.

These and other capabilities of embodiments of the disclosed subject matter will be more fully understood after a review of the following figures, detailed description, and claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DESCRIPTION

Figure 1:
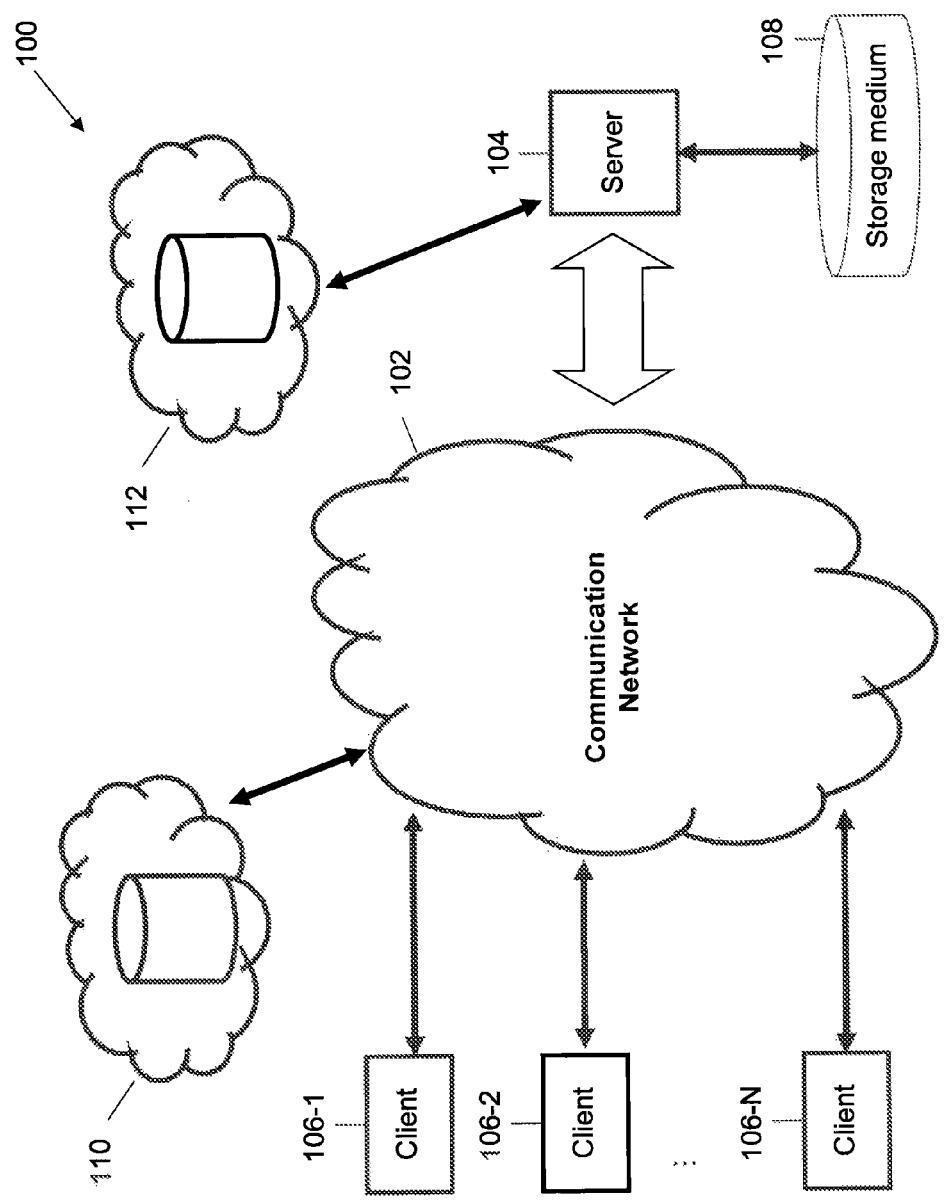
FIG. 1 illustrates an exemplary networked computing environment in accordance with some embodiments.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Mechanisms, such as browser extensions, can potentially modify a user's browser experience. The logic and control of these mechanisms are typically self-contained in the web browser, making these mechanism more complex, less flexible and robust, and more difficult to maintain and extend. Embodiments of the disclosed subject matter can provide features for a web event framework, which can reduce system complexity, improve flexibility and robustness, and increase maintainability and extendibility.

In one exemplary implementation, a web event framework can include a framework plugin, a framework server, and a framework policy store. The framework plugin can be embedded inside a web browser. The framework server can be independent and outside the realm of web browsers and can receive framework events from one or more framework plugins or other external event sources. The framework server can determine a framework action based on the framework event and a framework policy stored in a policy store, and then forward the framework action back to the framework plugin embedded within the web browser or execute the framework action, for example, if it's a system command. The framework policy can be updated to customize the web event framework. The framework plugin can process web pages based on the framework actions received from the framework server. Some exemplary user scenarios include: a certain event is triggered when a particular URL is hit; certain web pages or applications are locked or disabled based on a corporate policy; certain browser settings and security policies are customized based on a user's location, IP address, or credentials, etc.; and web browsers respond to remote connection session changes.

In one exemplary use scenario, a framework server can generate a framework action to automatically launch a frequently-used work-related website in a user's web browser when it is 9 AM on weekdays or to block certain company secure websites when it is 5 PM or during weekends. In another exemplary use scenario, when a framework server receives an external event indicating a laptop computer has left the corporate building, the framework server can generate a framework action closing all browser windows/tabs loaded with corporate confidential information.

Embodiments of the disclosed subject matter can be implemented in a networked computing environment. FIG. 1 illustrates an exemplary networked computing environment 100 in accordance with certain embodiments of the disclosed subject matter. The networked computing environment 100 can include a server 104, at least one client 106 (e.g., client 106-1, 106-2, . . . 106-N), a physical storage medium 108, and cloud storage 110 and 112, which can all be coupled, directly or indirectly to a communication network 102.

Each client 106 can communicate with the server 104 to send data to, and receive data from, the server 104 across the communication network 102. Each client 106 can be directly coupled to the server 104. Additionally, each client 106 can be connected to server 104 via any other suitable device, communication network, or combination thereof. For example, each client 106 can be coupled to the server 104 via one or more routers, switches, access points, and/or communication network (as described below in connection with communication network 102). A client 106 can include, for example, a desktop computer, a mobile computer, a tablet computer, a cellular device, a smartphone, or any computing systems that are capable of performing computation.

Server 104 can be coupled to at least one physical storage medium 108, which can be configured to store data for the server 104. Preferably, any client 106 can store data in, and access data from, the physical storage medium 108 via the server 104. FIG. 1 shows the server 104 and the physical storage medium 108 as separate components; however, the server 104 and physical storage medium 108 can be combined together. FIG. 1 also shows the server 104 as a single server; however, server 104 can include more than one server. FIG. 1 shows the physical storage medium 108 as a single physical storage medium; however, physical storage medium 108 can include more than one physical storage medium. The physical storage medium 108 can be located in the same physical location as the server 104, at a remote location, or any other suitable location or combination of locations.

FIG. 1 shows two embodiments of a cloud storage 110 and 112. Cloud storage 110 and/or 112 can store data from physical storage medium 108 with the same restrictions, security measures, authentication measures, policies, and other features associated with the physical storage medium 108. While FIG. 1 shows the cloud storage 112 separate from the communication network 102, cloud storage 112 can also be part of communication network 102 or another communication network. The server 104 can use only cloud storage 110, only cloud storage 112, or both cloud storages 110 and 112. While, FIG. 1 shows one cloud storage 110 and one cloud storage 112, more than one cloud storage 110 and/or more than one cloud storage 112 or any suitable combination thereof can be used.

The communication network 102 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. While FIG. 1 shows the network 102 as a single network, the network 102 can also include multiple interconnected networks listed above.

Figure 2:
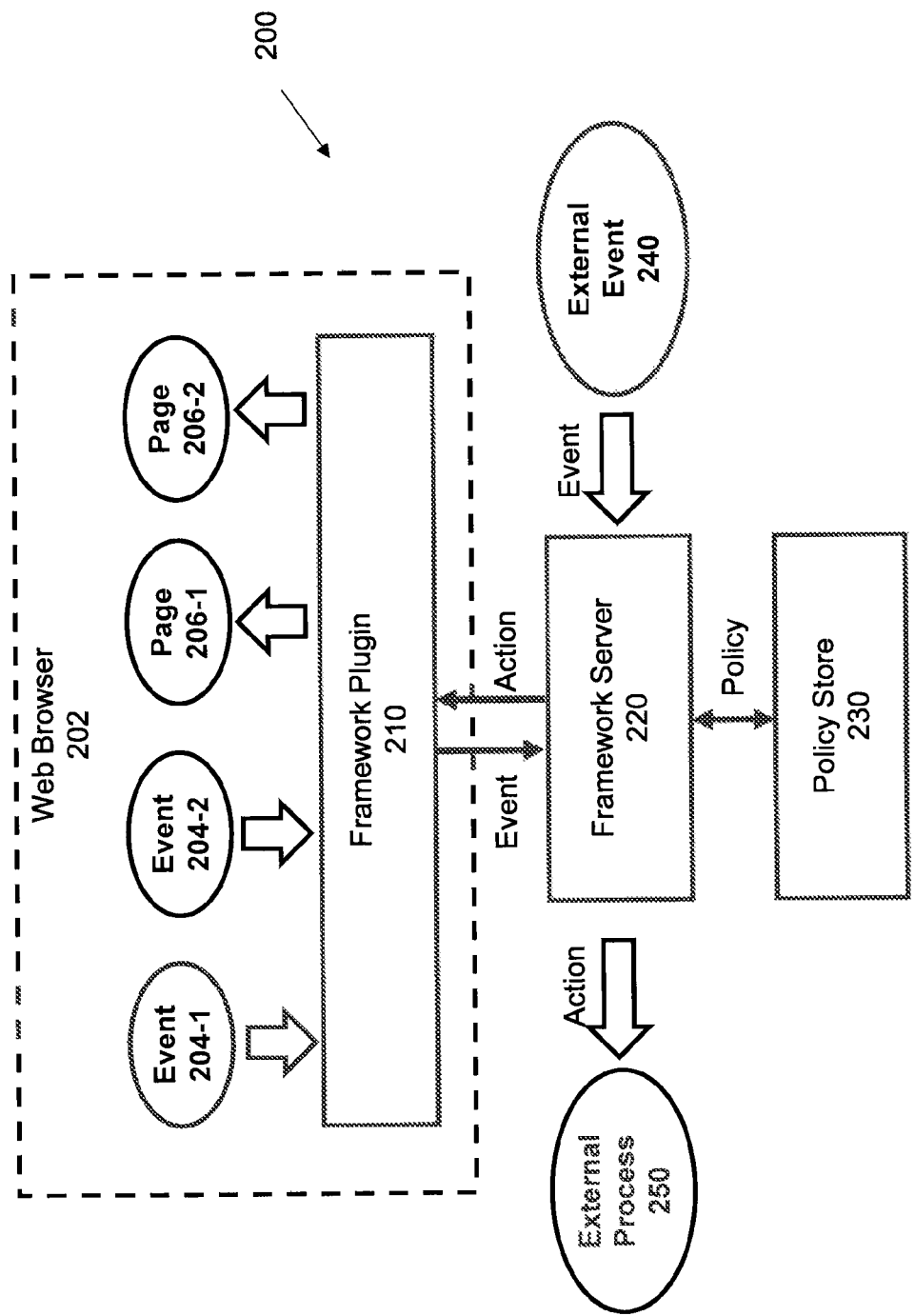
FIG. 2 illustrates an exemplary web event framework arrangement in accordance with some embodiments.

FIG. 2 illustrates an exemplary web event framework arrangement 200 according to certain embodiments of the disclosed subject matter. The web event framework arrangement 200 can include a framework plugin 210, a framework server 220, and a policy store 230.

Referring to FIG. 2, the framework plugin 210 can be associated with a web browser 202. A web browser 202 can be associated with one or more of the framework plugins 210. When multiple plugins are associated with one web browser, functionalities can be split among the multiple plugins. In one example, the framework plugin 210 can be embedded within the web browser 202; in another example, only a portion of the framework plugin 210 is embedded within web browser 202 and the rest can be outside but coupled to the web browser 202. The framework plugin 210 can receive events (e.g., 204-1 and 204-2, etc.) from the web browser 202. One type of such received events are web events generated by the web browser 202, such as navigating to a webpage. The framework plugin 210 can also perform actions in connection with the web browser 202, such as generating or modifying pages (e.g., 206-1 and 206-2, etc.). More examples of actions that can be performed by the framework plugin 210 are discussed later.

The framework server 220 can communicate with the framework plugin 210. The framework server 220 can receive an event (e.g., a framework event) from the framework plugin 210, determine an action (e.g., a framework action) based on the framework event, and forward the action to the framework plugin 210. In some embodiments, the framework server 220 can be outside and not associated with the web browser 202. In one example, the framework server 220 can reside locally on the same computing device as the framework plugin 210; in another example, the framework server 220 can reside remotely on a different computing device.

In addition, the framework server 220 can receive events (e.g., external event 240) from an external event source and can also perform external actions (e.g., initiating an external process 250). An external event source can either be local at the same computing device or be remote at a different computing device. An external action can be performed either locally at the same computing device or remotely at a different computing device. Additional details about external events and external actions are discussed later in this document.

In some embodiments, a framework server 220 can run a communication server (e.g., a socket server) listening for connections from one or more framework plugins 210. In some other embodiments, a framework server 220 can also run a communication server (e.g., a HTTP server) listening for messages (e.g., HTTP POST messages) from external event sources or other framework servers. A framework server 220 in a web event framework can be different from a traditional web server or proxy. According to embodiments of the disclosed subject matter, web pages can still be served by traditional web servers and a framework server 220 does not need to serve or download web pages directly.

In some embodiments, a framework plugin 210 can connect to a framework server 220 when it is first loaded (e.g., when its associated web browser 202 starts). Alternatively, a framework plugin 210 can connect to a framework server 220 at a later time. In some embodiments, a framework server 220 can halt or suspend web browser activities if a framework plugin is not detected. For example, AppSense's Application Manager product can be utilized to detect process launches and control the execution and/or internet access of the launched process.

The framework server 220 can also receive a policy (e.g., a framework policy) from a policy store 230. A framework policy can define how the framework server 220 determine a framework action based on a framework event. In one example, the policy store 230 can reside locally on the same computing device as the framework server 220; in another example the policy store 230 can reside remotely on a different computing device. In some embodiments, the policy store 230 can contain one configuration file per end user. In other embodiments, for example for a large enterprise, the policy store 230 can contain a generic configuration file suitable for a plurality of users. The generic configuration file can be customized and delivered, via the policy store, to each unique end user. In some other embodiments, there can be a global universal configuration file.

Figure 3:
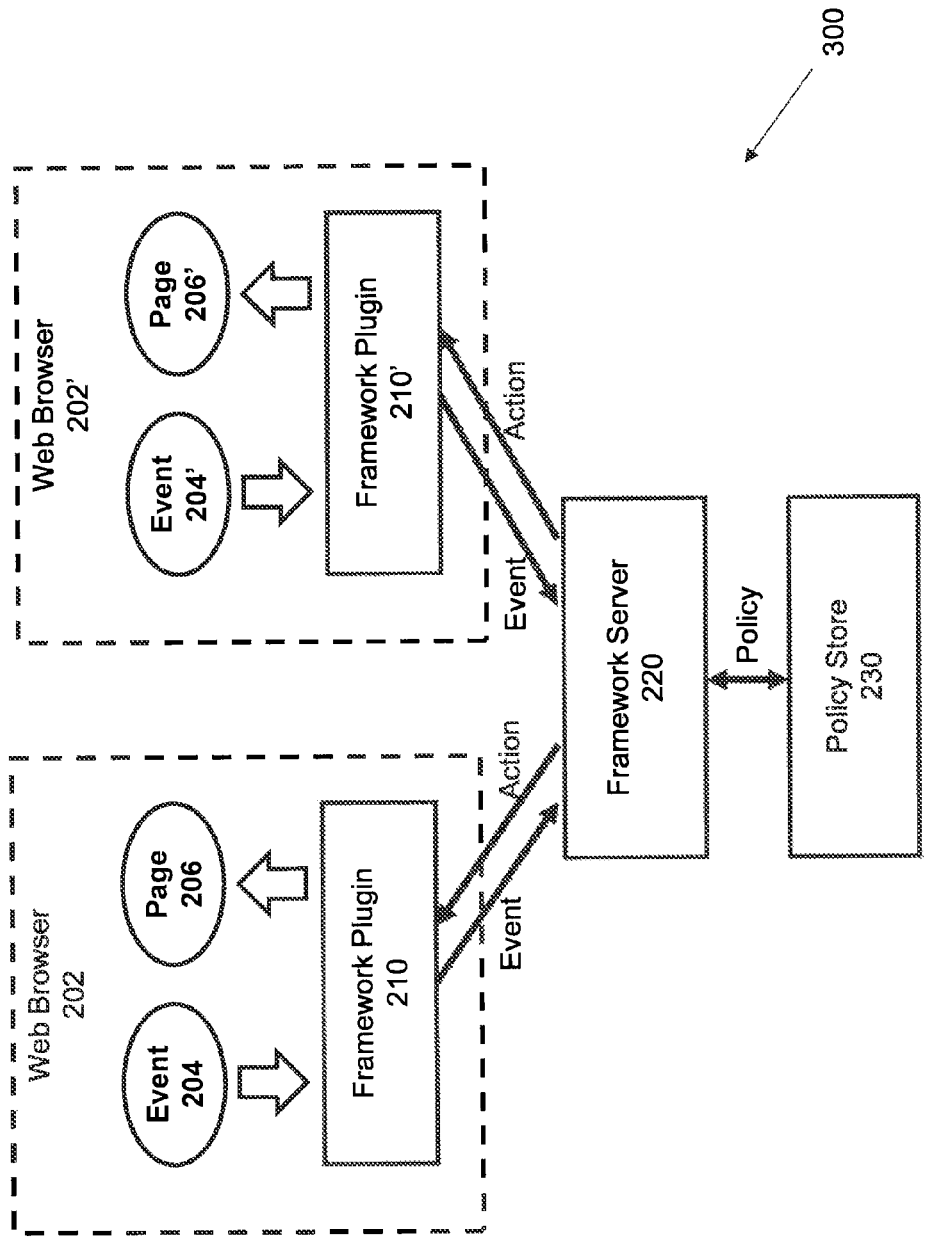
FIG. 3 illustrates another exemplary web event framework arrangement in accordance with some embodiments.

FIG. 3 illustrates another exemplary web event framework arrangement 300 according to certain embodiments of the disclosed subject matter. The web event framework arrangement 300 can include multiple framework plugins 210 and 210', a framework server 220, and a policy store 230. In this embodiment, the framework server 220 can operate in a manner similar to that described above with respect to FIG. 2, while being connected to multiple framework plugins.

Referring to FIG. 3, the framework plugin 210 can be associated with a web browser 202 while the framework plugin 210' can be associated with a web browser 202'. The web browsers 202 and 202' can be different types of web browsers. For example, the web browser 202 can be an Internet Explorer (IE) from Microsoft while the web browser 202' can be a Chrome browser from Google. The web browsers 202 and 202' can also be different sessions of a same type of web browsers. For example, the web browser 202 can be one IE browser session while the web browser 202' can be a different IE browser session. The framework plugin 210 can receive events (e.g., 204) from the web browser 202 while the framework plugin 210' can receive events (e.g., 204') from the web browser 202'. The framework plugin 210 can also perform actions (e.g., modifying a page 206) in the web browser 202 while the framework plugin 210' can also perform actions (e.g., modifying a page 206') in the web browser 202'.

The framework server 220 can communicate with both framework plugins 210 and 210'. The framework server 220 can receive an event (e.g., a framework event) from the framework plugin 210, determine an action (e.g., a framework action) based on the framework event, and forward the action to the other framework plugin 210' associated with the other web browser 202'. In this manner, an event at one web browser can cause an action at another web browser. In some embodiments, the framework server 220 can be outside and not associated with either web browser 202 or 202'. In one example, the framework server 220 can reside locally on the same computing device as the framework plugin 210 or 210'; in another example the framework server 220 can reside remotely on a different computing device. The framework server 220 can also receive a policy (e.g., a framework policy) from a policy store 230. A framework policy can define how the framework server 220 determine a framework action based on a framework event. In one example, the policy store 230 can reside locally on the same computing device as the framework server 220; in another example the policy store 230 can reside remotely on a different computing device.

In some embodiments, security considerations in some web browsers may prevent the framework server 220 from initiating an inbound connection into a framework plugin (e.g., 210'). In these situations, the framework plugin (e.g., 210') can initiate an outbound connection out to the framework server 220. Once a connection has been made, data traffic can flow freely in both directions. In other embodiments, additional security measures, for example in Internet Explorer 10 on Windows 8, may allow a connectivity to the framework server 220 only if the framework server 220 has a known DNS name (e.g., localhost). In these situations, a framework server on a remote machine may need to have a valid DNS entry to be accessible.

In addition, like illustrated in FIG. 2, the framework server 220 in FIG. 3 can also receive events from an external event source and perform external actions (e.g., initiating an external process). In one exemplary scenario, clicking on "I'm feeling lucky" at Google.com in an IE browser can open a tab with the search results in a Safari browser.

Figure 4:
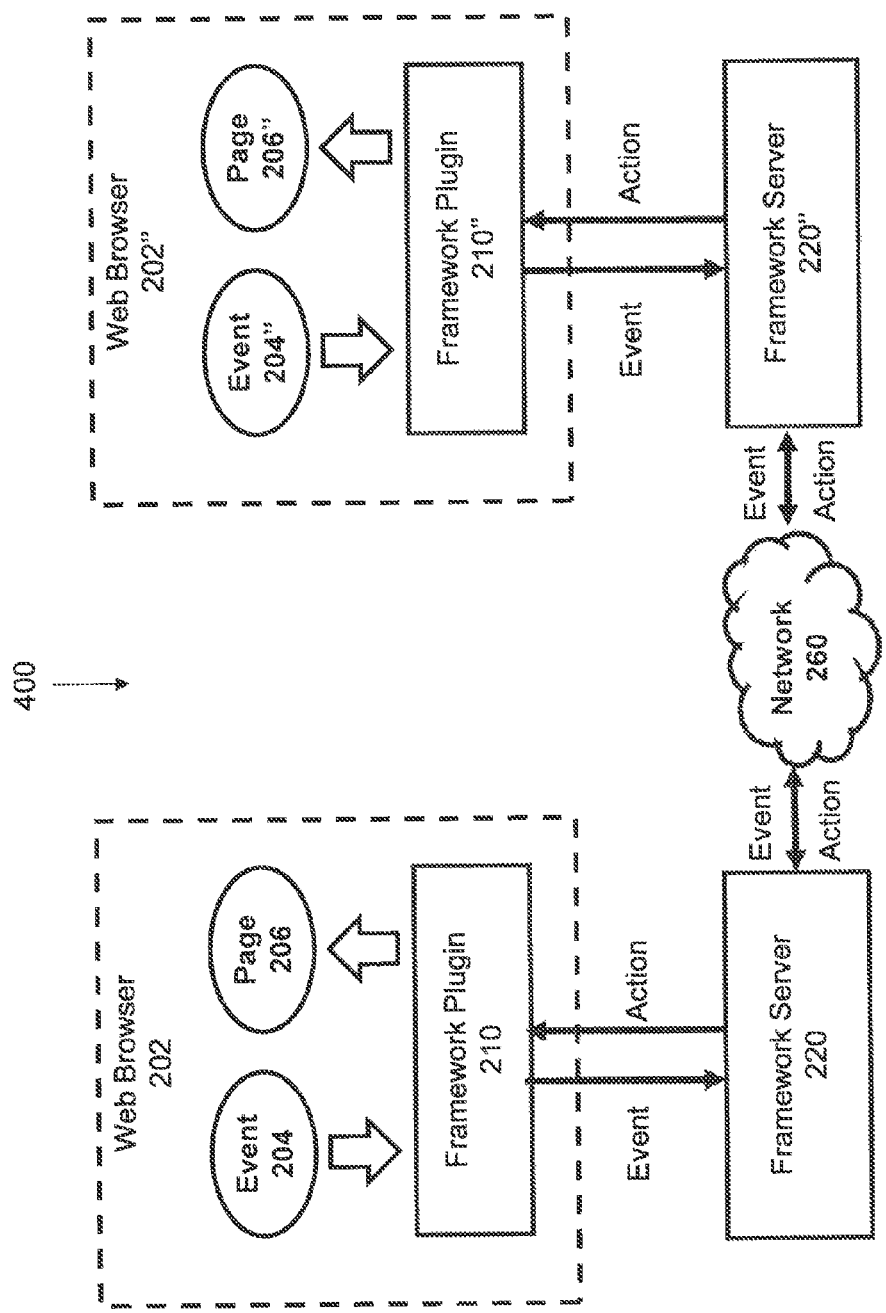
FIG. 4 illustrates yet another exemplary web event framework arrangement in accordance with some embodiments.

FIG. 4 illustrates yet another exemplary web event framework arrangement 400 according to certain embodiments of the disclosed subject matter. The web event framework arrangement 400 can include multiple framework plugins 210 and 210', multiple framework servers 220 and 220', and a network 260.

Referring to FIG. 4, the framework plugin 210 can be associated with a web browser 202 while the framework plugin 210" can be associated with a web browser 202". The web browsers 202 and 202" can be the same or different types of web browsers. In one example, the web browsers 202 and 202" can both be an IE browser on different computing devices. In another example, the web browsers 202 can be an IE on one computer device (e.g., a Windows PC) while the web browser 202" can be a Chrome browser from Google on a different computing device (e.g., a Mac computer from Apple). The framework plugin 210 can receive events (e.g., 204) from the web browser 202 while the framework plugin 210" can receive events (e.g., 204") from the web browser 202". The framework plugin 210 can also perform actions (e.g., modifying a page 206) in the web browser 202 while the framework plugin 210" can also perform actions (e.g., modifying a page 206") in the web browser 202". The framework plugin 210 and the web browser 202 can reside on a different computing device from the framework plugin 210" and the web browser 202".

The framework server 220 can communicate with the framework plugins 210. The framework server 220" can communicate with the framework plugins 210". The framework server 220 can communicate with the framework server 220" over a network 260. In some embodiments, a framework server 220/220" can run a communication server (e.g., a HTTP server) listening for framework events/actions (e.g., via HTTP POST messages) from other framework servers. A HTTP server can be chosen, for example, because of its compatibility with firewalls. The framework plugins 202 and 202" can communicate with each other via the framework servers 220 and 220". In some embodiments, the framework server 220 can receive a framework event from the framework plugin 210, determine a framework action based on the framework event, and forward the framework action over the network 260 to the other framework server 220", which can in turn forward the received framework action to the other framework plugin 210" associated with the other web browser 202". In some other embodiments, the framework server 220 can receive a framework event from the framework plugin 210 and forward the framework event over the network 260 to the other framework server 220", which can in turn determine a framework action based on the framework event and then forward the determined framework action to the other framework plugin 210" associated with the other web browser 202". In some embodiments, the framework servers 220 and 220" can each have its own policy store or framework policy. In some other embodiments, the framework servers 220 and 220" can share one common policy store or framework policy, which can reside locally with either framework server 220/220' or be accessed remotely via the network 260.

In addition, like illustrated in FIG. 2, the framework servers 220 and 220" in FIG. 4 can also receive events from an external event source and perform external actions (e.g., initiating an external process). In one exemplary scenario, clicking on "I'm feeling lucky" at Google.com in an IE browser on a PC can open a tab with the search results in a Safari browser on a Mac.

Figure 9:
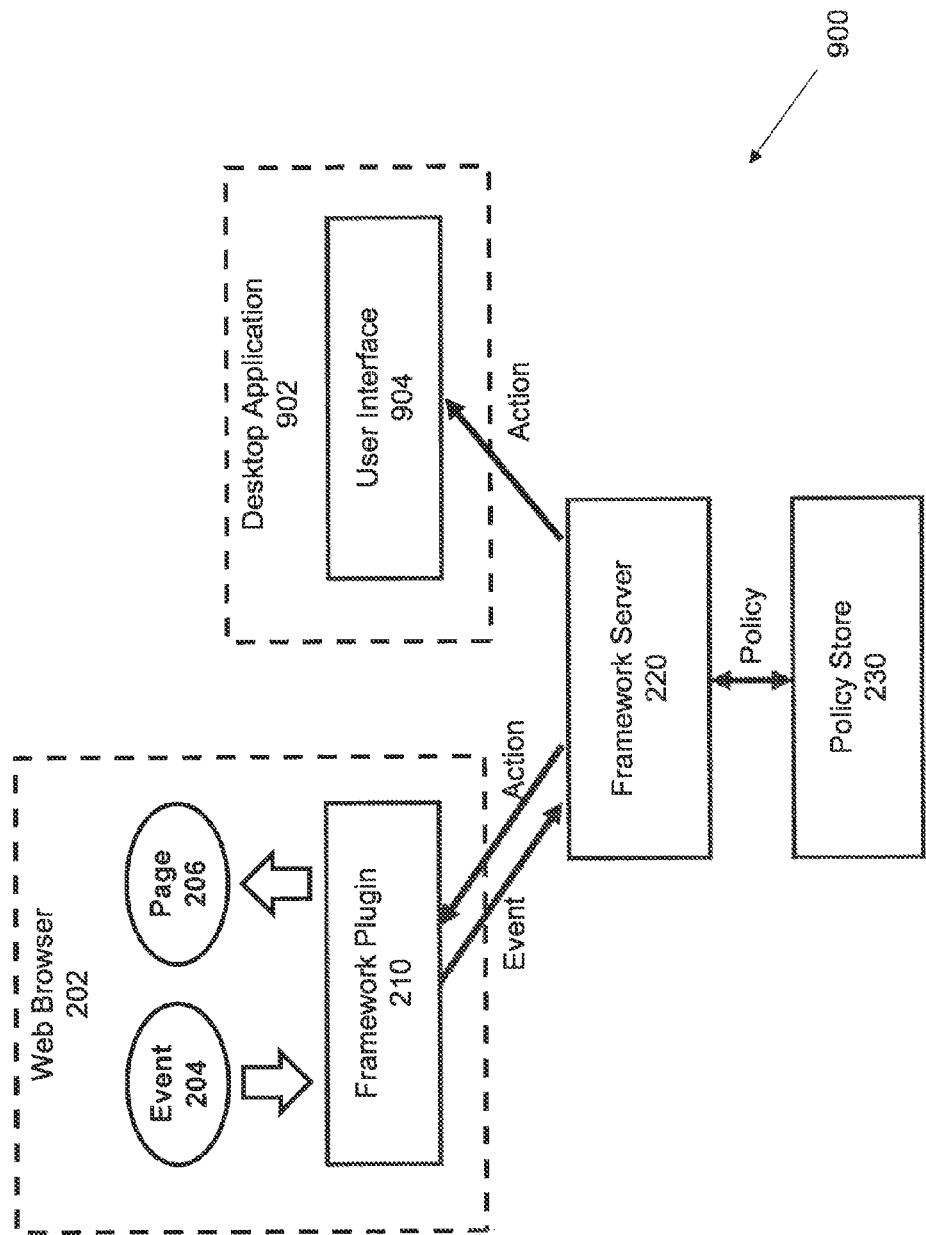
FIG. 9 illustrates a further exemplary web event framework arrangement in accordance with some embodiments.

FIG. 9 illustrates yet another exemplary web event framework arrangement 900 according to certain embodiments of the disclosed subject matter. The web event framework arrangement 900 can include a web browser 202 with a framework plugin 210, a framework server 220, and a policy store 230. The arrangement 900 can also include a desktop application 902, which may be stored on the same or a separate computer system from the other components and may be an application other than a web browser. For example, the desktop application 902 may be a dedicated interface for an internal database associated with a client network, productivity software such as a document generator or docket manager, or any other desktop application for which one or more policies is created by a user or administrator of the web framework. Any number of desktop applications 902 may be included in the arrangement 900.

The desktop application 902 may include a user interface 904 by which a user can interact with the application 902. The interface 904 may include the ability to interpret user input, such as mouse and keyboard input, into instructions that can be carried out by the application 902. As a particular example of an external action as described above with respect to FIG. 2, the framework server 220 may submit inputs to the user interface 904 in order to initiate commands on the desktop application 902. These commands may be carried out as a framework action initiated in response to one or more framework events being submitted to the framework server 220 by the framework plugin 210, which may in turn reflect activity on the web browser 202. As further described below, the web framework may allow for contextual information from a page 206 shown on the web browser 202 to be retrieved and used in the desktop application 902. For example, a reference to a particular document (such as a patent) within a web browser 206 may result in a command to a document database 902 to retrieve additional data regarding the document. As another example, log-in information submitted within a browser window 206 may be submitted within a desktop application 902 to automatically log in a user to additional services. Context transfer may occur by means of specific framework actions and events described below.

Figure 5:
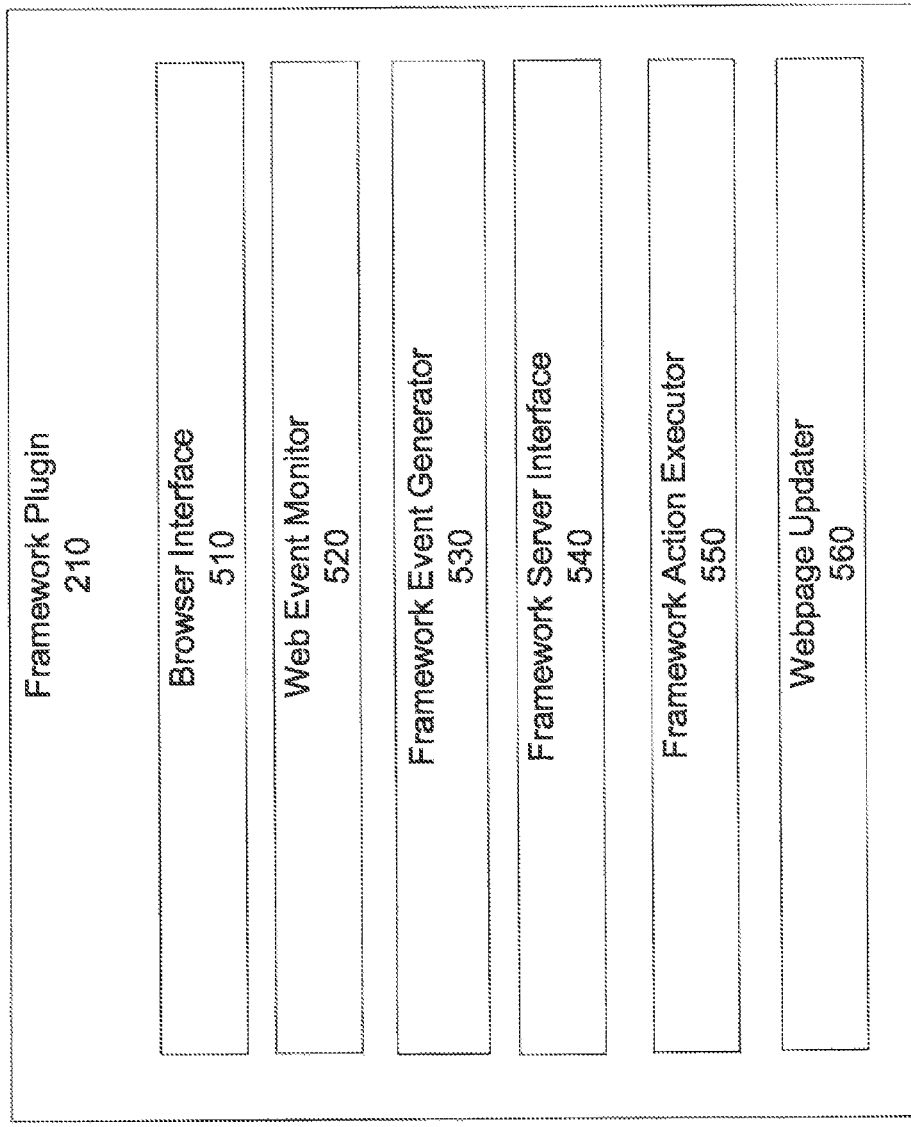
FIG. 5 illustrates a block diagram of an exemplary web event framework plugin in accordance with some embodiments.

FIG. 5 illustrates a block diagram of an exemplary web event framework plugin 210 according to certain embodiments of the disclosed subject matter. The framework plugin 210 can include a browser interface 510, a web event monitor 520, a framework event generator 530, a framework server interface 540, a framework action executor 550, and a webpage updater 560. The framework plugin 210 can include additional modules, fewer modules, or any other suitable combination of modules that perform any suitable operation or combination of operations.

The browser interface 510 can allow the framework plugin 210 to communicate with a web browser (e.g. 202). In one example, the browser plugin 210 can receive events (e.g., web browsing events) generated by the web browser through the browser interface 510. In another example, the browser plugin 210 can send actions (e.g., closing a browser window) or action results (e.g., a modified webpage) to the web browser through the browser interface 510.

The web event monitor 520 can monitor the events received, e.g., via the browser interface 510, from a web browser (e.g., 202). Examples of web events monitored by the web event monitor 520 can include:
"Before Navigate"
"Tab Changed"
"Page Loaded"
"Body Clicked"

The "Before Navigate" web event can occur when a web browser is just about to navigate to a new webpage. The "Tab Changed" web event can occur when a web browser changes to a new tab. For example, when a Google search result is clicked on, a "Tab Changed" web event is generated. The "Page Loaded" web event can occur when a document (e.g., a webpage) has been loaded into a tab. The "Body Clicked" web event can occur when an element (e.g., a button or a link) on a webpage is clicked. The list of web events being monitored by the framework plugin 210 can be updated and customized to fit individual needs. In some embodiments, the list of web events being monitored by the framework plugin 210 can be defined in an external file, such as a framework policy stored in a policy store (e.g., 230). If the web event monitor 520 detects an event it does not recognize, it can be configured to ignore this event. Optionally, an alert (e.g., an error message) can be generated and presented to the user or administrator.

The framework event generator 530 can generate a framework event based on a web event, e.g., detected by the web event monitor 520. Examples of framework events generated by the framework event generator 530 can include:
"navigate"
"pageLoaded"
"bodyClick"

A "navigate" framework event can be generated when a "Before Navigate" or "Tab Changed" web event is detected (e.g., when a web browser is just about to navigate to a new webpage or change to a new tab). A "pageLoaded" framework event can be generated when a "Page Loaded" web event is detected (e.g., when a webpage has been loaded into a tab). A "bodyClick" framework event can be generated when a "Body Clicked" web event is detected (e.g., when a hyperlink on a webpage is clicked).

Additionally, the framework event generator 530 may generate a framework event in response to particular framework actions received from the framework server 220. For example, a "getContext" framework action (as further described below) automatically triggers the particular framework event "context" which returns context data from a specified web page. The "context" framework event is therefore generated by the framework event generator 530 each time the framework executor 550 (described below) executes a "getContext" action received at the framework server interface 540 (described below).

In some embodiments, a framework event can be associated with one or more parameters which can be either required or optional. Examples of parameters associated with framework events can include:

"source"—the URL of the webpage where the framework event originates

"tabID"—the ID of the tab where the framework event originates

"text"—the inner text of a clicked element on a webpage

"href"—the href of a clicked element on a webpage

"value"—the value of a clicked element on a webpage

"id"—the ID of a clicked element on a webpage

"name"—the name of a clicked element on a webpage

"type"—the type of a clicked element (e.g., a button or a link, etc.) on a webpage "items"—the data specified by a "getContext" action In some embodiments, the "source" and "tabID" parameters can be required for all framework events; the "type" parameter can be required for some framework events (e.g., "bodyClick" framework events). The list of framework events generated by the framework plugin 210, how they are generated, and how they correspond to certain web events can be updated and customized to fit individual needs. In some embodiments, the list of framework events, how they are generated, and how they correspond to certain web events can be defined in an external file, such as a framework policy stored in a policy store (e.g., 230). If the framework event generator 530 does not know how to handle a detected web event, it can be configured to ignore this web event. Optionally, an alert (e.g., an error message) can be generated and presented to the user or administrator.

The framework server interface 540 can allow the framework plugin 210 to communicate with a framework server (e.g. 220). In one example, the browser plugin 210 can forward a framework event generated by the framework event generator 530 to a framework server through the framework server interface 540. In another example, the browser plugin 210 can receive a framework action from a framework server through the framework server interface 540. In one example, the framework server interface 540 can be implemented using JavaScript and the socket.io library. A listener can be set up in the framework server. The framework plugins can connect to the listener and then maintain a permanent connection between the server and plugins. Communication can then be bi-directional using packets constructed from, e.g., JavaScript Object Notation (JSON) key/value pairs.

The framework action executor 550 can execute a framework action, e.g., received from a framework server. More details about the framework action executor 550 executing framework actions will be discussed later in this document.

The webpage updater 560 can generate or update a webpage based on the framework action received from a framework server. In some embodiments, the webpage updater 560 can work with the framework action executor 550 to generate or update a webpage. More details about the webpage updater 560 generating/updating webpages will be discussed later in this document.

Figure 6:
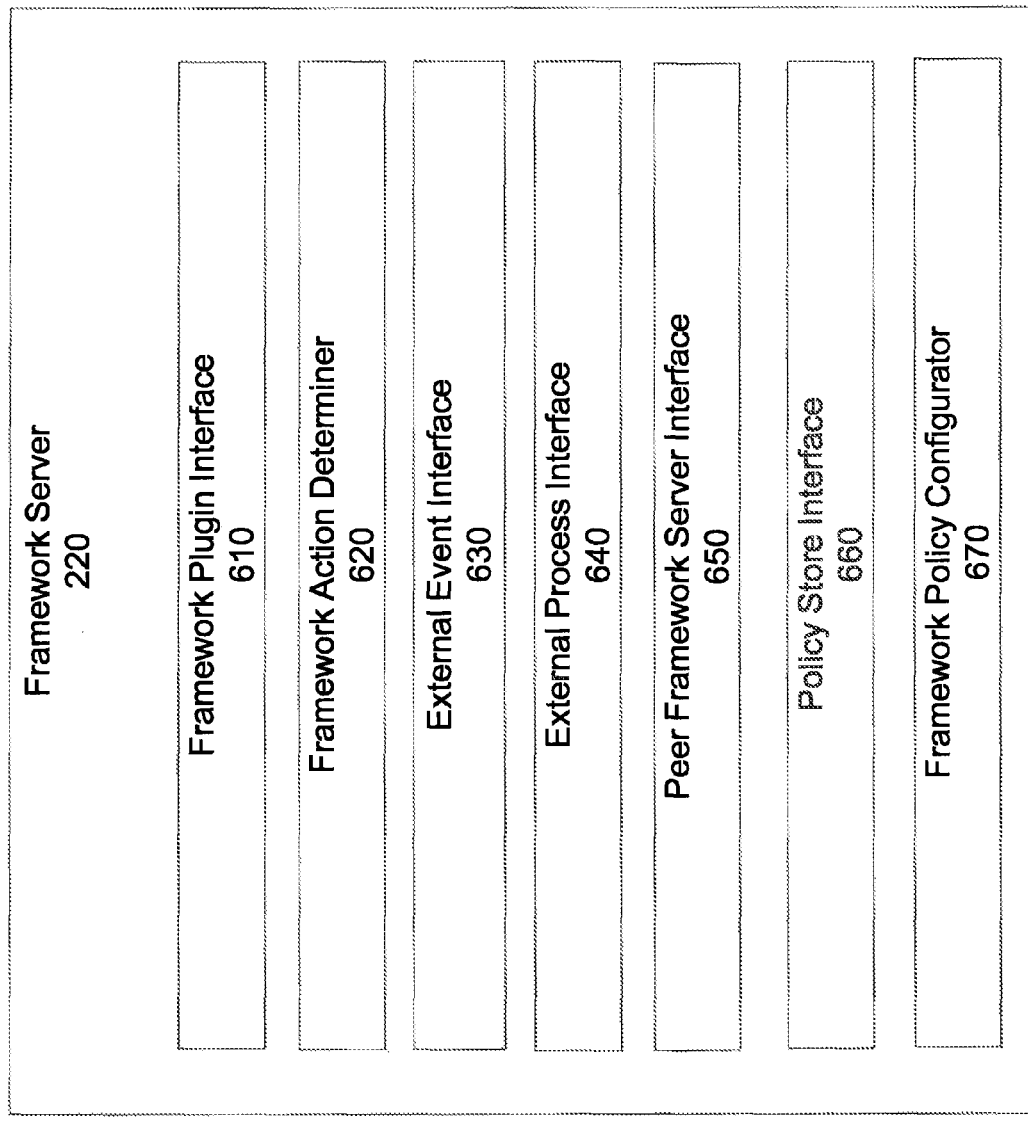
FIG. 6 illustrates a block diagram of an exemplary web event framework server in accordance with some embodiments.

FIG. 6 illustrates a block diagram of an exemplary web event framework server 220 according to certain embodiments of the disclosed subject matter. The framework server 220 can include a framework plugin interface 610, a framework action determiner 620, an external event interface 630, an external process interface 640, a peer framework server interface 650, a policy store interface 660, and a framework policy configurator 670. The framework server 220 can include additional modules, fewer modules, or any other suitable combination of modules that perform any suitable operation or combination of operations.

The framework plugin interface 610 can allow the framework server 220 to communicate with a framework plugin (e.g. 210). In one example, the framework server 220 can receive a framework event generated at a framework plugin through the framework plugin interface 610. In another example, the framework server 220 can forward a framework action to a framework plugin through the framework plugin interface 610. In some embodiments, the framework server 220 can communicate with multiple framework plugins through a common framework plugin interface 610. In some other embodiments, the framework server 220 can communicate with multiple framework plugins through different framework plugin interfaces 610, each of which corresponds to one of the multiple framework plugins 210.

The framework action determiner 620 can determine a framework action. In some embodiments, the framework action can be determined based on a framework event, e.g., received at the framework plugin interface 610. Examples of framework actions can include:

"navigate"
"relink"
"disableElement"
"closeTab"
"externalProcess"
"getContext"

A framework action can be associated with one or more arguments which can be either required or optional. For example, a "navigate" framework action can cause a web browser to navigate to a target URL and can thus have an argument specifying this target URL; a "navigate" framework event can also have an argument defining whether the webpage specified by the target URL should be opened in a new or existing page/tab. A "relink" framework action can cause a web browser to change all hyperlinks on a webpage that match a given pattern to a target URL or certain JavaScript function and can thus have an argument specifying this given pattern and target URL or JavaScript function. A "disableElement" framework action can cause a web browser to disable a certain element on a webpage based on the web element's ID, name, text, or css selector and can thus have an argument identifying this element on the webpage. A "closeTab" framework action can cause a web browser to close the current tab, a specific tab, or a range of tabs and can thus have an argument identifying the tab(s) to be closed. An "externalProcess" framework action can initiate an external process or application and can thus have an argument defining the launching options for the external application. Alternatively, an "externalProcess" framework action may control an existing program by, for example, providing a script for automatically submitting inputs to the program by means of the program's user interface, or submitting commands by means of a program API. A "getContext" action can be used to retrieve specific data from a web page, and may include a unique ID matching the "getContext" action to a "context" event, as well as an argument defining what context data to retrieve (the "keys").

In some embodiments, the argument(s) for a framework action can be fixed, pre-configured based on the type of framework action, or generated dynamically based on the corresponding framework event and its parameters. For example, a target argument for a "navigate" framework action specifying the target URL can be derived from a domain parameter of a corresponding "navigate" framework event defining the URL a web browser is about to navigate to. In some other embodiments, more data can be collected from web events to provide more information for the corresponding framework action. For example, text entered into a web form on a webpage can be extracted and used to generate one or more arguments for a framework action.

The external event interface 630 can allow the framework server 220 to receive external events (e.g., 240) from an external event source. An external event source can either be local at the same computing device or be remote at a different computing device. In one example, the framework server 220 can receive a time event via the external event interface 630 from a system clock module indicating the time is 9 AM or 5 PM. In another example, the framework server 220 can receive a location event via the external event interface 630 from a system GPS module indicating a computing device (e.g., a laptop computer) has left or entered a corporate building. The framework action determiner 620 can determine a framework event based on the external event received from the external event source. In one example, the framework action determiner 620 can generate a framework action to automatically launch a frequently-used work-related website in a user's web browser when it is 9 AM on weekdays or to block certain company secure websites when it is 5 PM or during weekends. In another example, when the framework server 220 receives an external event indicating a laptop computer has left the corporate building, the framework server 220 can generate a framework action closing all browser windows/tabs loaded with corporate confidential information.

Examples of external event sources can include hardware modules (e.g., GPS device), software modules (e.g., AppSense Environment Manager or AppSense Application Manager), or combinations of both. In one example, an AppSense Environment Manager can generate an external event indicating a user login/logoff. In another example, an AppSense Application Manager can generate an external event indicating an application startup/shutdown. In some embodiments, an external event can originate from various remote technologies, such as Remote Desktop Protocol (RDP) from Microsoft or Independent Computing Architecture (ICA) from Citrix.

The external process interface 640 can allow the framework server 220 to initiate certain external processes (e.g., 250). An external process can be executed either locally at the same computing device or remotely at a different computing device. In one example, the framework server 220 can launch a Microsoft Word application via the external process interface 640. The external process being initiated can be based on a framework action generated by the framework action determiner 620. For example, when the framework server 220 receives a framework event indicating a stock-trading webpage has been loaded in a web browser, the framework server 220 can generate a framework action launching the Calculator application on the local computing device. In some embodiments, an external process can be initiated through various remote technologies, such as Remote Desktop Protocol (RDP) from Microsoft or Independent Computing Architecture (ICA) from Citrix.

In some implementations, the external process interface 640 may activate a process or provide instructions to an active process in response to an "context" event, which provides specific data from a web page 206 in response to a "getContext" action sent to the framework plugin 210 associated with the web browser 202. The "context" event may include specific inputs which can be submitted to the process to be interpreted as user inputs in order to carry out one or more instructions.

The peer framework server interface 650 can allow the framework server 220 to communicate with other framework server (e.g., 220") over a network (e.g., 260). The framework server 220 can send/receive framework events or actions via the peer framework server interface 650 to/from another framework server (e.g., 220"). In some embodiments, a framework server (e.g., 220) can receive a framework event from an associated framework plugin (e.g., 210) and forward the framework event to the other framework server (e.g., 220"), which can in turn determine a framework action based on the received framework event and then forward the determined framework action to its associated framework plugin (e.g., 210"). In some other embodiments, the framework server (e.g., 220) can receive a framework event from an associated framework plugin (e.g., 210), determine a framework action based on the framework event, and forward the framework action to the other framework server (e.g., 220"), which can in turn forward the received framework action to its associated framework plugin (e.g., 210"). In one exemplary scenario, clicking on "I'm feeling lucky" at Google.com in an IE browser on a PC can open a tab with the search results in a Safari browser on a Mac.

Still referring to the framework server 220 in FIG. 6 and in particular to the framework action determiner 620, a framework action can also be determined based on a framework policy. In some embodiments, a framework policy can define whether and how to handle a particular framework event, and what, if any, framework action should be generated in response to a particular framework event with certain parameter(s). Some exemplary framework policies are described below. In these examples, the framework policies are presented and stored in JavaScript Object Notation (JSON) format. A framework policy file can contain one or more framework policies like the ones discussed below.

---

Framework Policy A:

```
"onNavigate":[
    {
        "action": "navigate",
        "domain": "www.bing.com",
        "target": "http://www.google.com"
    }
]
```

---

According to Framework Policy A, when a "navigate" framework event is received at the framework server with a domain parameter "www.bing.com," a "navigate" framework action is generated with a target argument "http://www.google.com." When this framework policy is implemented, a user trying to use the Bing search engine will be redirected to use the Google search engine. The framework server 220 can look up the domain names in a framework policy and identify one matching the domain parameter in an received framework event. The matching can be done by exact text matching or by some more robust matching mechanisms (e.g., regular expressions).

| Framework Policy B: |
| --- |
| ```
"onPageLoaded":[
    {
        "action": "relink",
        "domain": "www.bbc.co.uk",
        "source": "http://www.bbc.co.uk/news/england/",
        "target": "http://www.bbc.co.uk/news/scotland/"
    },
    {
        "action": "disableElement",
        "domain": "eu1.salesforce.com",
        "id": "phSearchButton"
    }
]
``` |

According to Framework Policy B, when a "pageLoaded" framework event is received at the framework server with a domain parameter "www.bbc.co.uk," a "relink" framework action is generated with a source argument "http://www.bbc.co.uk/news/england" and a target argument "http://www.bbc.co.uk/news/scotland." Upon implementing this framework policy, when a user visiting BBC's UK website, the links to England news will be changed to linking to Scotland news. Also according to Framework Policy B, when a "pageLoaded" framework event is received at the framework server with a domain parameter "eu1.salesforce.com," a "disableElement" framework action is generated with an id argument "phSearchButton." When this framework policy is implemented, the search button on the salesforce.com webpage is disabled.

| Framework Policy C: |
| --- |
| ```
"onBodyClick":[
    {
        "action": "externalProcess",
        "domain": ".",
        "commandLine": "say %text% %title%"
    }
]
``` |

According to Framework Policy C, when a "bodyClick" framework event is received at the framework server, an "externalProcess" framework action is generated with a commandLine argument "say%text%%title%." The "." domain parameter can indicate that the domain name is irrelevant for this particular framework event and/or action. Upon implementing Framework Policy C, when a user clicks on any element on a webpage, the computing device speaks out the text of the element.

| Framework Policy D: |
| --- |
| ```
"onExternalEvents":[
    {
        "action": "closeTab",
        "domain": "external:sessionChanged",
        "tabUrl": "https://"
    }
]
``` |

According to Framework Policy D, when an external event is received with a domain parameter "external:sessionChanged" at the framework server, a "closeTab" framework action is generated with a tabUrl argument "https://." The "external:sessionChanged" domain parameter can be treated as a peudo domain name. The "https://" tabUrl argument can indicate the "closeTab" action applies to all tabs when an URL starts with "https://". Upon implementing Framework Policy C, when a user's secure session changes, the web browser closes all tabs of secure webpages.

| Framework Policy E: |
| --- |
| ```
"onPageLoaded":[
    {
        "action": "getContext",
        "domain": "www.bbc.co.uk",
        "items":[ { "key":"Username", "id":"textTitle1"},
{"key":"Fullname","id":"textTitle2"}],
        "contextGUID":"1234-5678-90"
    }
],
"onContext":[
    {
        "action":"externalProcess",
        "contextGUID":"1234-5678-90",
        "process":"appName.exe",
        "script":[Navigate to app page with Username and Fullname]
    }
]
``` |

According to Framework Policy E, upon loading a page within the "www.bbc.co.uk" domain, a "getContext" framework action is generated with an "items" argument having two keys: a username and a full name. The "getContext" framework action also has a context GUID which is used to associated it with the appropriate "context" event.

Upon being sent a "getContext" action with these arguments, the browser plugin responds by generating a "context" event with "items" parameters equal to the user name and fullname of the web page and the appropriate "contextGUID" parameter. This event, according to the Framework Policy E, results in the generation of an "externalProcess" action in which "appName" is controlled to navigate to a particular app page using the particular received user name and full name as parameters. The italicized text within the value field for the "script" argument represents a set of user inputs or API commands which carry out such a function, which will be dependent on the particular application or process being controlled.

If the framework action determiner 620 does not know how to handle a received framework event, it can be configured to ignore this framework event. Optionally, an alert (e.g., an error message) can be generated and sent to users and/or administrators.

Referring now to the framework plugin 210 in FIG. 5, the framework action executor 550 can execute a framework action, e.g., received from a framework server; the webpage updater 560 can generate or update a webpage based on the framework action received from a framework server. In one example, the framework action executor 550 can execute the "closeTab" action illustrated in Framework Policy D—closing tabs of secure webpages. In another example, the webpage updater 560 can coordinate with the framework action executor 550 to execute the "disableElement" action illustrated in Framework Policy B—disabling the search button on the saleforce.com webpage. If the framework action executor 550 does not know how to handle a received framework action, it can be configured to ignore this framework action. Optionally, an alert (e.g., an error message) can be generated and sent to users and/or administrators.

According to embodiments of the disclosed subject matter, a web event framework can reduce system complexity. For example, the framework server 220 and the framework plugin 210 can be implemented free of complex business logic. The framework server 220 can simply be an event sink, receiving framework events from all event sources and determining framework actions based on the framework policy. According to embodiments of the disclosed subject matter, a web event framework can also improve flexibility and maintainability. For example, changing a framework policy itself can change the behaviors of a web event framework without modifying the framework server 220 and/or the framework plugin 210. According to embodiments of the disclosed subject matter, a web event framework can also increase extendibility. For example, adding framework events to a framework policy can expand the list of events handled by a web event framework without updating the framework server 220 and/or the framework plugin 210.

Referring back to the framework server 220 in FIG. 6, the policy store interface 660 can allow the framework server 220 to retrieve or save a framework policy from/to a policy store (e.g., 230). A policy store can reside locally on the same computing device as the framework server 220 or remotely on a different computing device. The framework policy configurator 670 can configure the framework server 220, e.g., based on a framework policy. In some embodiments, the framework policy configurator 670 can also customize a framework policy based on a user's or administrator's needs.

Figure 7:
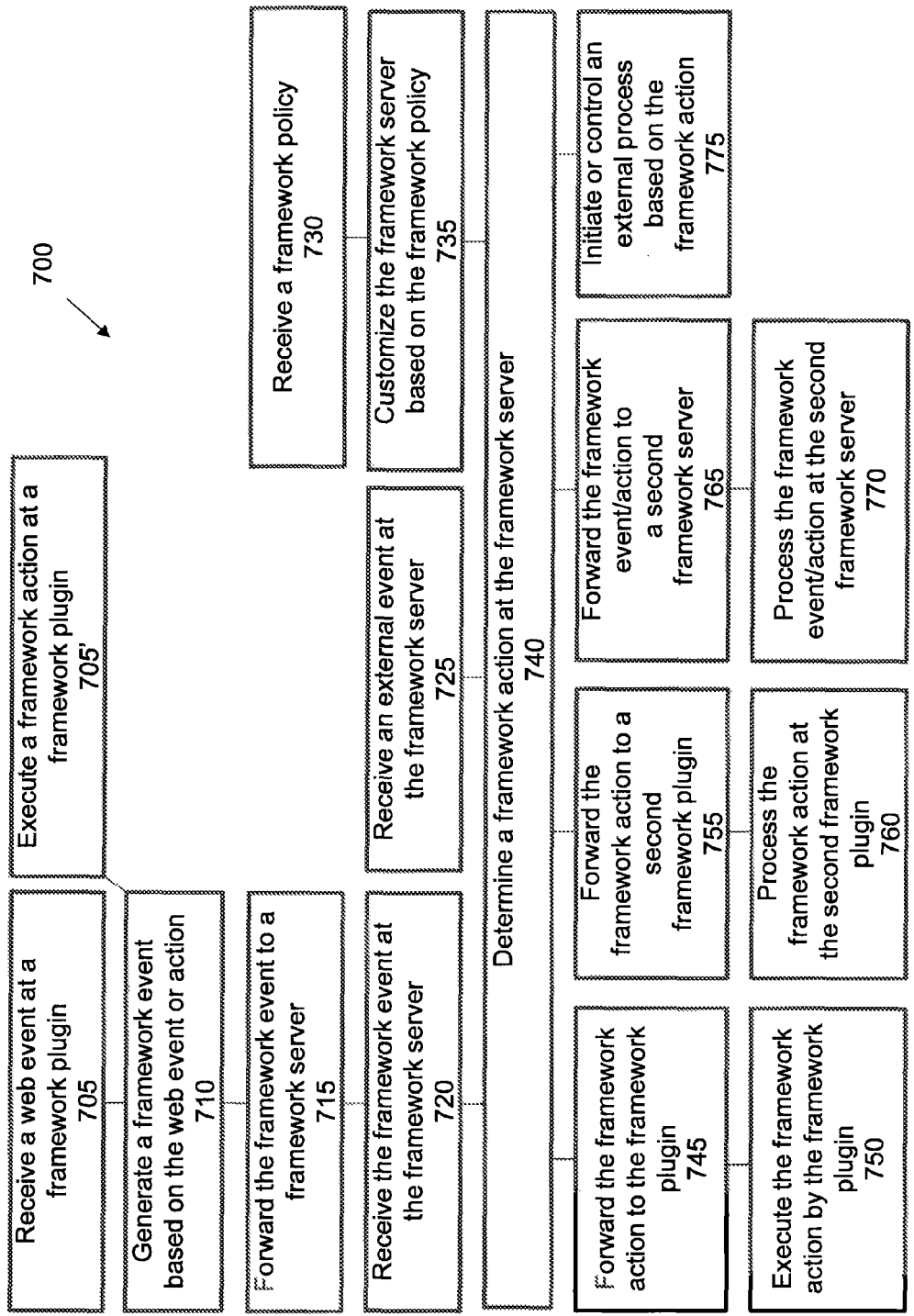
FIG. 7 includes an exemplary operation of an exemplary web event framework in accordance with some embodiments.

FIG. 7 illustrates an exemplary operation 700 of an exemplary web event framework according to certain embodiments of the disclosed subject matter. The operation 700 can be modified by, for example, having stages rearranged, changed, added and/or removed.

At stage 705, a web event can be received at a framework plugin (e.g., 210). The web event can be received from a web browser (e.g., 202) associated with the framework plugin. For example, a "Before Navigate" web event can be received when a web browser is about to navigate to a new webpage.

Alternatively, at stage 705', a framework action can be executed at the framework plugin (e.g., 210). The framework action may have been received from the framework server (e.g., 220; see steps 745 and 750) and may be the sort of action that produces a response from the plugin in the form of a framework event. For example, a "getContext" action can be received when the framework server is requiring specific data from a web page (e.g., 206) in order to carry out one or more framework policies.

At stage 710, a framework event can be generated based on the web event or framework action. The framework event can be generated by the framework plugin (e.g., 210). For example, a "navigate" framework event can be generated in response to a "Before Navigate" web event, or a "context" event can be generated in response to a "getContext" action. If the framework plugin does not recognize a received web event, the web event can be ignored. Optionally, an alert (e.g., an error message) can be generated and sent to users and/or administrators.

At stage 715, the framework event can be forwarded to a framework server (e.g., 220). The framework server 220 can be independent from and not associated with any web browser (e.g., 202). In one example, the framework server 220 can reside locally on the same computing device as the framework plugin 210 or browser 202; in another example the framework server 220 can reside remotely on a different computing device (e.g., over a network). The communication between a framework plugin and a framework server can be synchronous or asynchronous, e.g., based on a framework policy.

At stage 720, the framework event can be received at the framework server (e.g., 220). The framework event can be received from one or more framework plugins from a local or remote computing devices.

Alternatively or additionally, at stage 725, an external event can be received at the framework server (e.g., 220). The external event can be received from an external event source on a local or remote computing device. For example, the framework server 220 can receive a time event via the external event interface 630 from a system clock module indicating the time is 9 AM or 5 PM.

Optionally, at stage 730, a framework policy can be received. A framework policy can define how the framework server 220 determines a framework action based on an event. A framework policy can be received from a policy store (e.g., 230), which can reside either locally on the same computing device as the framework server 220 or remotely on a different computing device. At stage 735, the framework server (e.g., 220) can be customized, e.g., based on the framework policy received. In some embodiments, the framework policy configurator 670 can customize the framework server based on a framework policy.

At stage 740, a framework action can be determined at the framework server (e.g., 220). The framework action can be determined based on a framework event and/or an external event. The determination of a framework action can also be based on a framework policy as discussed earlier in this document. If the framework server does not recognize a received event, the event (framework event or external event) can be ignored. Optionally, an alert (e.g., an error message) can be generated and sent to users and/or administrators.

At stage 745, the framework action can be forwarded to the framework plugin, e.g., by the framework server. In some embodiments, the framework plugin can be the same framework plugin where the corresponding framework event originates.

At stage 750, the framework action can be executed by the framework plugin. The framework plugin can execute the framework action immediately, after a certain delay, or upon certain triggering event. The timing of execution can be customized and can be defined in a framework policy. In some embodiments, the framework action can be executed by the framework action executor 550 and/or webpage updater 560. If the framework plugin does not recognize a received framework action, the framework action can be ignored. Optionally, an alert (e.g., an error message) can be generated and sent to users and/or administrators.

Alternatively or additionally, at stage 755, the framework action can be forwarded to a second framework plugin, e.g., by the framework server. In some embodiments, the second framework plugin can be different from the framework plugin where the corresponding framework event originates.

At stage 760, the framework action can be executed by the second framework plugin. The second framework plugin can execute the framework action immediately, after a certain delay, or upon certain triggering event. The timing of execution can be defined in a framework policy. In some embodiments, the framework action can be customized and can be executed by the framework action executor 550 and/or webpage updater 560 in the second framework plugin. If the second framework plugin does not recognize a received framework action, the framework action can be ignored. Optionally, an alert (e.g., an error message) can be generated and sent to users and/or administrators.

Alternatively or additionally, at stage 765, the framework action or event can be forwarded to a second framework server, e.g., by the framework server. In some embodiments, the second framework server can reside remotely and can communicate with other peer framework servers over a network.

At stage 770, the framework action or event can be processed by the second framework server. When the second framework server receives a framework action from the framework server, the second framework server can forward to a second framework plugin associated with the second framework server. When the second framework server receives a framework event from the framework server, the second framework server can determine a second framework action based on the received framework event and a second framework policy, then forward the determined framework action to the second framework plugin associated with the second framework server. The second framework plugin can then execute the framework action received from the second framework server.

Alternatively or additionally, at stage 775, an external process can be initiated. The external process can be initiated based on the framework action. The external process can also be initiated based on a framework policy.

As an example of the framework operation 700, consider Framework Policy E above. In response to a web browser loading a page of the "www.bbc.co.uk" domain (step 705), the framework plugin associated with the browser generates a "pageLoad" event with parameters including the domain of the loaded page (step 710) and forwards the framework event to the framework server (step 715). The framework server receives the "pageLoad" event (step 720) and, based on the "on PageLoaded" policy from Framework Policy E, determines a "getContext" action (step 740) with a particular "contextGUID" and certain "items" of data that it requires. The action is forwarded to the framework plugin (step 745) and executed by the framework plugin (step 745).

Upon executing the "getContext" framework action (step 705'), the framework plugin generates a "Context" framework event with the same "contextGUID" and parameters matching the required "items" of data (step 710). The framework plugin forwards the framework event to the framework server (715) which receives the "Context" framework event (720). Based on the "onContext" policy from Framework Policy E which matches the "contextGUID" of the "Context" framework event, the framework server determines an "externalProcess" action with a "script" argument based on the "items" parameters from the "Context" framework event (step 740). The system controls the "appName.exe" process according to the "externalProcess" framework action (step 775).

Figure 8:
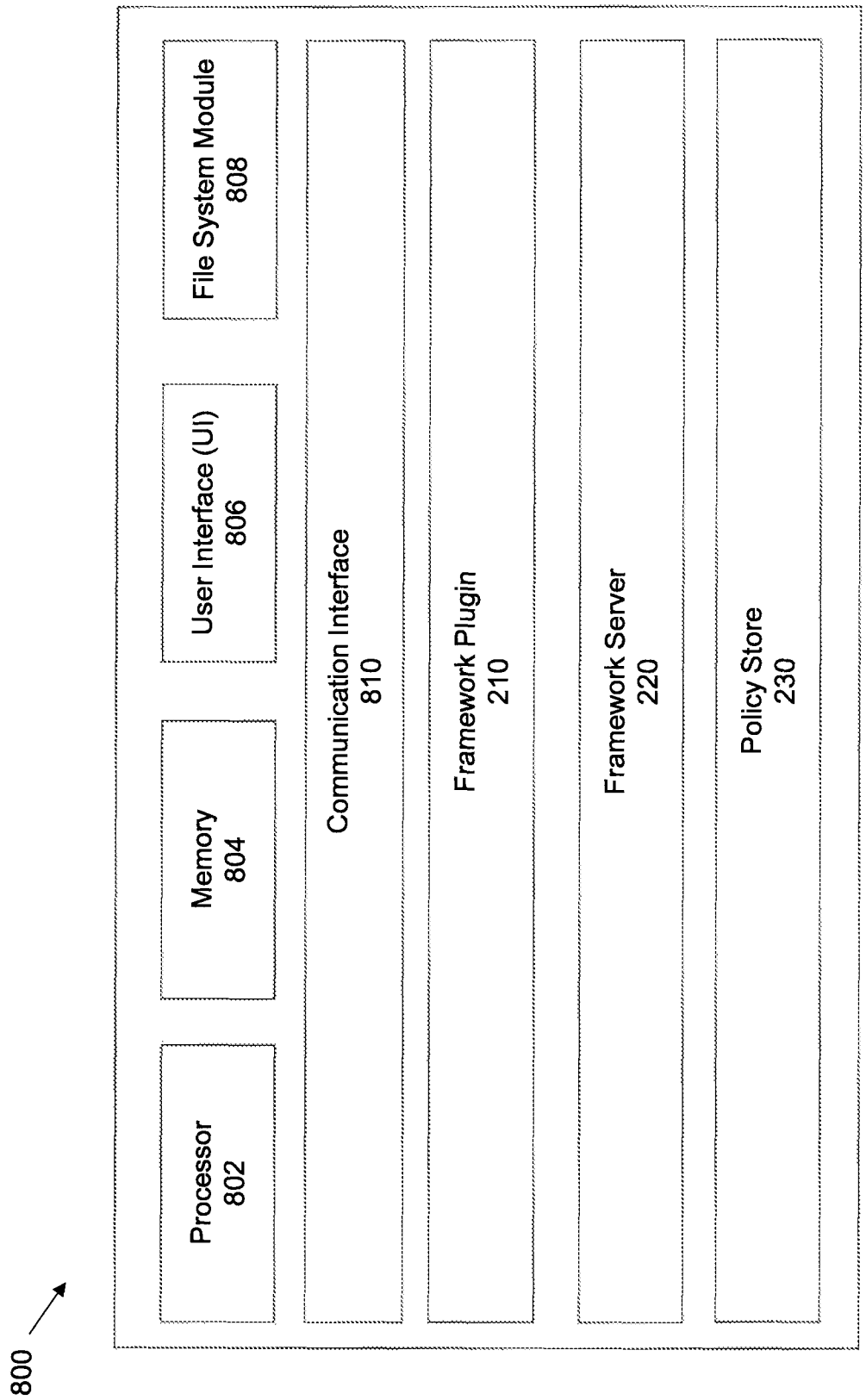
FIG. 8 illustrates a block diagram of an exemplary computing device in accordance with some embodiments.

FIG. 8 illustrates a block diagram of an exemplary computing device 800 according to certain embodiments of the disclosed subject matter. The computing device 800 can include at least one processor 802 and at least one memory 804. The processor 802 can be hardware that is configured to execute computer readable instructions such as software. The processor 802 can be a general processor or be an application specific hardware (e.g., an application specific integrated circuit (ASIC), programmable logic array (PLA), field programmable gate array (FPGA), or any other integrated circuit). The processor 802 can execute computer instructions or computer code to perform desired tasks. The memory 804 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The computing device 800 can also optionally include a user interface (UI) 806, a file system module 808, and a communication interface 810. The UI 806 can provide an interface for users to interact with the computing device 800 in order to access the web event framework arrangement 200/300/400. The file system module 808 can be configured to maintain a list of all data files, including both local data files and remote data files, in every folder in a file system. The file system module 808 can be further configured to coordinate with the memory 804 to store and cache files/data. The communication interface 810 can allow the computing device 800 to communicate with external resources (e.g., a network or a remote client/server). The computing device 800 can also include a framework plugin 210, a framework server 220, and a policy store 230. The description of the framework plugin 210, the framework server 220, and the policy store 230 and their functionalities can be found in the discussion of FIGS. 1-7 and 9. The computing device 800 can include additional modules, fewer modules, or any other suitable combination of modules that perform any suitable operation or combination of operations.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D.

What is claimed is:
1. A computerized method, comprising:
receiving, at a server, a first framework event, the first framework event associated with a page load of a web page on a web browser;
determining, at the server, a first action based on the first framework event and a policy, the first action (1) associated with a Globally Unique Identifier (GUID) that associates the first action with a second framework event and (2) including an argument indicating context data to retrieve from the web page loaded on the web browser;

sending the first action to a plugin associated with the web browser such that the plugin, in response to receiving the first action, executes the first action to:
retrieve the context data from the web page; and
generate the second framework event that includes the context data and the GUID;
receiving, at the server, the second framework event from the plugin;
determining, at the server, a second action based on the second framework event and the policy; and
initiating an external process based on the second action by sending instructions to an application such that the application, in response to receiving the instructions, performs the external process.

2. The computerized method of claim 1, wherein the first framework event is generated by the plugin in response to receiving a web event from the web browser.

3. The computerized method of claim 2, wherein the web event is the web browser loading the web page.

4. The computerized method of claim 1, wherein the web browser runs on a compute device, wherein performing the external process includes running a desktop application on the compute device.

5. The computerized method of claim 4, wherein performing the external process further includes submitting inputs based on the context data to the desktop application via a user interface.

6. The computerized method of claim 1, further comprising receiving the policy from a policy store.

7. The computerized method of claim 1, further comprising customizing the server based on the policy.

8. The computerized method of claim 1, further comprising:
receiving, at the server, an external event from an external event source, the external event source being a source other than the web browser; and
determining, at the server, the second action based on the external event and the policy.

9. The computerized method of claim 1, wherein the server is a first server and the policy is a first policy, the computerized method further comprising sending the second action over a network to a second server such that the second server, in response to receiving the second action, initiates the external process based on the second action.

10. The computerized method of claim 1, wherein the server is a first server and the policy is a first policy, the computerized method further comprising sending the second framework event over a network to a second server such that the second server, in response to receiving the second event, determines a third action based on the second framework event and a second policy.

11. A non-transitory computer readable medium having executable instructions operable to, when executed by a processor, cause the processor to:
receive, at a server, a first framework event, the first framework event associated with a page load of a web page on a web browser, the web browser located on a first compute device;
determine, at the server, a first action based on the first framework event and a policy, the first action (1) associated with a unique identifier that associates the first action with a second framework event and (2) including an argument indicating context data to retrieve from the web page loaded on the web browser;
send the first action to a plugin associated with the web browser such that the plugin, in response to receiving the first action, executes the first action to:
retrieve the context data from the web page; and
generate the second framework event that includes the context data and the unique identifier;
receive, at the server, the second framework event from the plugin;
determine, at the server, a second action based on the second framework event and the policy; and
initiate an external process based on the second action by sending instructions to an application located on a second compute device such that the application, in response to receiving the instructions, performs the external process.

12. A computer system for a web event framework, comprising:
a processor associated with a server, the processor configured to:
receive a first framework event, the first framework event associated with a page load of a web page on a first web browser;
determine a first action based on the first framework event and a policy, the first framework action (1) associated with a unique identifier that associates the first action with a second framework event and (2) including an argument indicating context data to retrieve from the web page loaded on the first web browser;
send the first action to a plugin associated with the first web browser such that the plugin, in response to receiving the first action, executes the first action to:
retrieve the context data from the web page; and
generate the second framework event that includes the context data and the unique identifier;
receive the second framework event from the plugin,
determine a second framework action based on the second framework event and the policy, and
initiate an external process based on the second action by sending instructions to a second web browser separate from the first web browser such that the second web browser, in response to receiving the instructions, performs the external process.

13. The computer system of claim 12, wherein the processor is further configured to receive the policy from a policy store.

14. The computer system of claim 13, wherein the processor is further configured to customize the server based on the policy.

15. The computer system of claim 12, wherein the processor is further configured to send the second action to the plugin such that the plugin, in response to receiving the second action, generates or modifies the web page.

16. The computer system of claim 12, wherein the processor is configured to:
receive an external event from an external event source, the external event source being a source other than the web browser; and
determine the second action based on the external event and the policy.

17. The computer system of claim 12, wherein the plugin is a first plugin and the web browser is a first web browser, the processor is further configured to communicate with a second plugin associated with a second web browser.

18. The computerized method of claim 1, wherein the web browser runs on a first compute device and the application is on a second compute device separate from the first compute device.

19. The computerized method of claim 1, wherein the web browser is a first type of web browser, the application is a second type of web browser different than the first type of web browser.

* * * * *

UNITED STATES PATENT AND TRADEMARK OFFICE
CERTIFICATE OF CORRECTION

PATENT NO. : 9,900,367 B2  
APPLICATION NO. : 14/132307  
DATED : February 20, 2018  
INVENTOR(S) : Paul Keith Branton Page 1 of 1

It is certified that error appears in the above-identified patent and that said Letters Patent is hereby corrected as shown below:

In the Claims

Column 22, Line 34 (Claim 12, Line 22):
"determine a second framework action based on the" should be -- determine a second action based on the --

Signed and Sealed this
Seventeenth Day of April, 2018

Andrei Iancu
*Director of the United States Patent and Trademark Office*